United States Patent [19]
Schuster

[11] Patent Number: 5,098,617
[45] Date of Patent: Mar. 24, 1992

[54] PROCESS OF MAKING A CARBON-CONTAINING ELECTRODE

[76] Inventor: Dietrich Schuster, Am Käfernberg 7, 6741 Frankweiler/Pfalz, Fed. Rep. of Germany

[21] Appl. No.: 576,190

[22] Filed: Aug. 27, 1990

Related U.S. Application Data

[63] Continuation of Ser. No. 326,556, Mar. 21, 1989, abandoned.

[30] Foreign Application Priority Data

Mar. 23, 1988 [DE] Fed. Rep. of Germany ....... 3809758

[51] Int. Cl.$^5$ .................. B29C 67/00; B29C 71/00
[52] U.S. Cl. ...................................... 264/27; 252/511; 264/82; 264/83; 264/105; 264/122; 264/126; 264/232; 264/320; 264/340

[58] Field of Search ............. 264/22, 82, 83, 105, 264/122, 125, 126, 232, 320, 340, 27; 252/511

[56] References Cited

U.S. PATENT DOCUMENTS 3,856,574 12/1974 Amagi et al. ................. 264/105 X
4,193,860 3/1980 Folser ............................ 264/105 X

*Primary Examiner*—Leo B. Tentoni
*Attorney, Agent, or Firm*—Staas & Halsey

[57] ABSTRACT

A process for the production of carbon-containing electrodes for electricity (current)-producing and/or electricity-storing cells includes mixing carbon-containing material with vinylpolymer-containing material and then heating the thus created mixture to such a temperature and a chemical change of the vinylpolymer occurs, so that the resultant composition becomes conductive.

14 Claims, 2 Drawing Sheets

PROCESS OF MAKING A CARBON-CONTAINING ELECTRODE

This is a continuation of copending application Ser. No. 07/326,556 filed on 3-21-89, now abandoned.

BACKGROUND OF THE INVENTION

1. Field of the Invention

The present invention concerns a process for the production of carbon-containing electrodes for electricity (current) producing and/or electricity-storing cells as well as their application.

2. Description of the Related Art

In the past, efforts have been made to produce organic polymers which can be utilized as so called "intrinsically conducting polymers", used in the field of electro-chemistry as electrode materials.

These efforts are of particular importance also because the previously used metallic or metal containing electrodes, in particular the poisonous heavy metal-electrodes, either in the form of their utilization as primary or secondary cells or during their disposal or recycling, create huge environmental problems. This is because the contents of these heavy metal electrodes, in particular the very poisonous metals cadmium, nickel, copper lead and mercury, unavoidably reach the ground-water and the air as poisonous materials.

A further disadvantage of heavy metal-electrodes rests in the high specific weights of their metallic contents which poses almost insurmountable problems for use of the heavy metal electrodes in traction cells and also to obtain a cost efficient storage of photo-voltaically gained solar energy.

Intrinsically conducting polymers mentioned above are desirable because they are light and environmentally acceptable.

In their structure, conducting polymers obey structure-chemically all the same principles, in that they are polymers with conjugated double-bond-systems. Thus they are for example the polyacetylene, polyphenylene, polypryrrole, polyaniline, etc. polymers.

In pure condition, however, these compounds are not yet conductors; they have to be doped to turn them into conductors, meaning that one has to bring charged ions to the $(CH)_x$-chain, whereby in particular iodine, $FeCl_3$, $As_5$ and others play a role. By means of this doping the charges are withdrawn from the chain or charges are brought upon the chain so that an ionic conductance is created, which carries out the transport of current.

Another direction of the development is shown by the so called composite-electrodes which are produced by compounding (mixing) of a non-conducting organic thermoplast with a conducting carbon material like carbon black and/or graphite and/or carbon fibers. Here the organic thermoplast serves as a matrix for a conductor and the composite electrode takes on electrically conducting properties above a certain percentage of conductor carbon black and/or graphite, that is above the so called percolation point.

If one combines such a composite electrode additionally with the metals and/or metal oxides which have a chemical redox-potential, then primary and secondary cells or cells with combined properties can be built. In this connection reference is made to the DE-OS 36 18 881.

SUMMARY OF THE INVENTION

An object of the present invention is, in complete contrast to the above-mentioned state of the art, to provide a way of producing organic electrode material which differs completely from the so far described ways of organic electrode material which differs fundamentally and essentially from the described ways and means of the state of the art.

Preferably, a process for the production of carbon-containing electrodes includes combining activated charcoal and a vinylpolymer of the general formula:

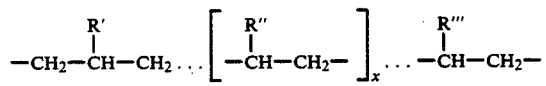

whereby
X = 1 to 100000
R' = halogen or ester-group
R'' = hydroxyl-group
R''' = ether-group
where the position of the substituents R', R'' and R''' is exchangeable among each other, said activated charcoal and vinylpolymer being further mixed with a 7.5% solution of polyvinylchloride in tetrahydrofuran to form a sludge which is dried, pulverized and placed in a form, and then subjected to a pressure of 2-2000 bar and a temperature of 40° to 300° C. to thereby yield an electrode.

This and other objects are met by providing intrinsically conducting polymers always starting from monomers and leading to an intrinsically conducting polymer without, as described, a conductor like carbon black, graphite or silver oxide which is combined with the polymeric non-conductor, whereby a completely unexpected and novel combination is achieved between two non-conductors to a conductor in that the non-conductor activated charcoal is combined with a non-conducting vinylpolymer. By application of pressure and temperature, both substances are so changed, modified and/or arranged with each other that a new organic conducting system is created.

This first essential effect is broadened by a second effect, namely that the created conducting system can be made in a second process step by oxidation by means of oxygen and/or by reduction by means of hydrogen also completely unexpectedly and surprisingly this conducting system to a reversible carrier of an electrochemically usable redox process.

Thus, for the first time, it is possible in a completely novel way to create an organic electrode material which at the same time combines conducting and reversible redox properties so that completely or almost completely metal-free and/or metal oxide-free electrodes can be produced.

The invention further concerns a process for the production as well as the application of this organic electrode material as is displayed in the appended claims in detail.

The following is said to the probable theoretical background of the invention:

The activated charcoal can be considered as an unisotropic solid body in which the carbon core structure of the organic polymers (wood, cellulose) from which it is made is still partially maintained, whereby crystalline zones with the structure of the layer structure of graphite alternatingly is present with amorphous areas in statistical distribution.

These amorphous areas, in which many empty spots and distributed spots prevent formation of a structure are the reason why activated charcoal is a non-conductor, since in these amorphous zones neither a valence- nor a conducting bond is available. Only within the layered structure of graphite is this the case, since for a diamond structure the transfer of electrons from the valence-bond into conducting bond is not possible. Moreover, in the activated charcoal, above all in the outer zones, many oxygen atoms are added and incorporated, which act as disturbing points and block the transfer of charges so that altogether activated charcoal, as said, is a non-conductor for the electric current:

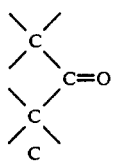

Those last mentioned disturbance points and empty points of the activated charcoal are those which turn the activated charcoal into such a valuable substance, since here a high enthalpy of reaction is in a way frozen in, in particular where there are still reactive oxygen atoms available.

If one brings under the conditions as described here, that is under high pressure and high temperature a polyvinyl chain to such an oxygen disturbance point, then a chemical reaction occurs with a polyvinyl chain and surface of the activated charcoal, whereby water is split off and the chain is added, as shown in the following.

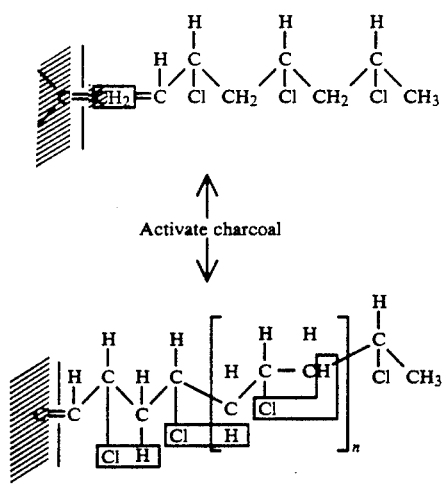

At the same time a destabilization of the polyvinyl chain occurs, which now spontaneous splits off hydrogen chloride and stabilizes upon formation of an alternating system of double bonds, as is formally shown in the following formula:

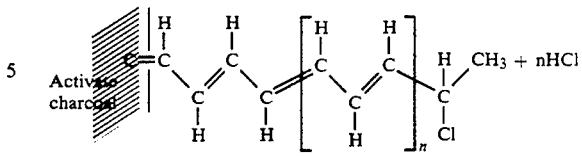

The polyvinyl-core-chain is then (partially) identical with a chain as results from the oxidative polymerization of acetylene. This polyvinyl-chain can naturally still contain halogen and/or other active groups.

Also the activated charcoal itself is changed by the whole process, since now structural empty positions and gaps disappear or are transformed into crystalline zones with the layered structure.

In other words, from the unstable area of amorphous, with an oxygen enriched zone of activated charcoal which prevents conduction results by addition to a polyvinyl-chain the formation of a stable crystalline layer structure in the activated charcoal which is connected with the stable chain of alternating double bonds, which themselves contain still other active components, like halogen, OH-groups, etc.

A new structure with a zwitter-system of conductance mechanism is formed, namely of electron conductance within the layer and ion-conductance within the chain. If from one of these components, e.g. halogen, electrons are withdrawn, then electrons are withdrawn from the chain and finally from the valence-bond of the carbon-graphite-structure connected with the chain.

This is a positive defect conductance which is also called an electronic semiconductor, or i-semiconductor (intrinsic semiconductor).

Naturally, the reverse is also possible, namely, the addition of electrons to the chain, so that an excess-conduction is produced.

The function principle of this invention lies in the completely unexpected possibility to build from two non-conductors, activated charcoal and polyvinyl compound, by combination with each other an over-structure, which has the properties of an intrinsic semiconductor, combined with an electrical conductor. Thus completely new possibilities of future applications of this invention are created.

The essence of the present invention is furthermore explained in the attached Figures and following examples which are of preferred embodiments.

DETAILED DESCRIPTION OF THE PREFERRED EMBODIMENTS

The present invention will be explained with reference to the following examples:

EXAMPLE 1

Description of the First Process step

Main-component 1 and main-component 2

3.0 g of activated charcoal of plant or animal origin with a particle size of e.g. 0.3 to 10 and/or 1 to 400 mesh with the pore volume e.g. of 0.1 to 3 cm$^3$/g and with an active surface of 100 to 1600 m$^2$/g are turned into a sludge with 16 g of a 7.5% solution of polyvinylchloride (PVC) in tetrahydrofuran which is subsequently within a time of 14 hours brought to complete dryness at a temperature from 20° to 40° C.

The dry material is pulverized in a turbomixer and then 2.1 g of the mixture are evenly distributed in a metal form and pressurized under a pressure of 200 bar at 150° C. for 30 minutes. In this way one obtains two tough brittle electrodes which have a specific surface resistance of 27 Ohm.cm.

Figure 1:
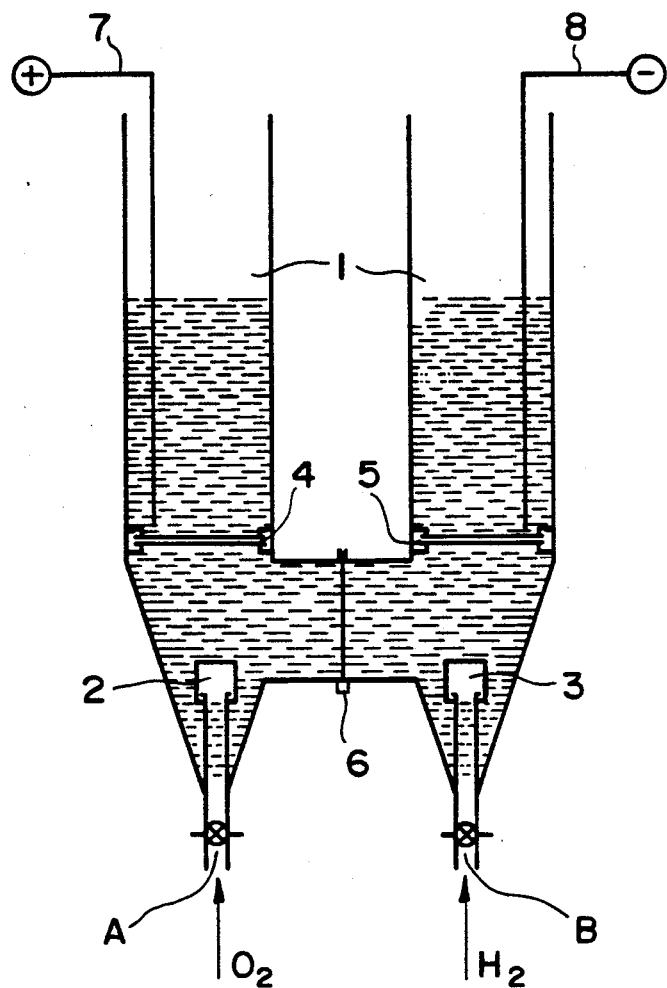
FIG. 1 is a schematic view showing the electrodes according to the present invention in an oxidizing apparatus.

Those two electrodes are now built into an apparatus which is presented in FIG. 1. This apparatus incorporates a container 1, frittes 2 and 3, electrodes 4 and 5, an ion-semi-permeable wall 6 of a perfluorated cationic ion exchanger and conductors 7 and 8.

Figure 2:
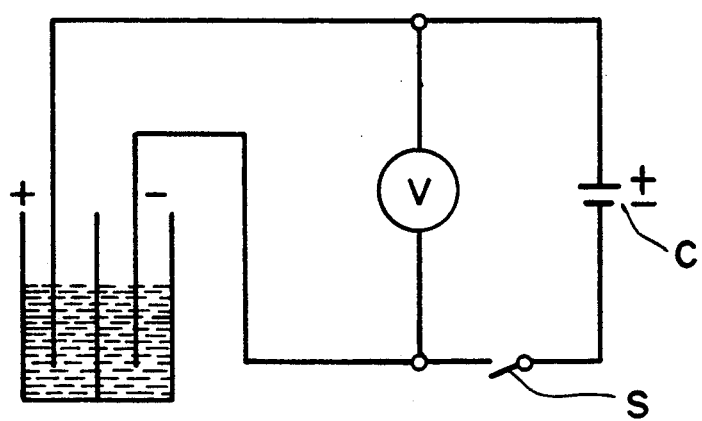
FIG. 2 is a schematic view showing additional features of the apparatus of FIG. 1.

This apparatus is illustrated in FIG. 2 combined with a voltage meter V and a constant current source C. The electrolyte apparatus on the left side of FIG. 2 is identical with the apparatus according to FIG. 1.

In the apparatus of FIG. 1, there is as an electrolyte in the anode chamber 2n KCL or 2n KBr or 2n KJ solution. In the cathode chamber is a 2n KOH solution. The switch S is opened.

After incorporation of the electrodes there is at first no voltage at the voltmeter. This, however, occurs immediately if one opens the valves A and B and oxygen and/or air at A and hydrogen at B are introduced. The voltage increases quickly to $U_o$ of 1.1 volt. Via a resistance of 2 ohm one conducts off the gained current and thus polarizes the electrodes for about 5 minutes to 120 minutes. Then one turns off the hydrogen addition and allows from the constant current source C a current to flow from 0.1 mA to 30 mA into the electrodes for 1 to 120 minutes. This process can be repeated several times.

Figure 3:
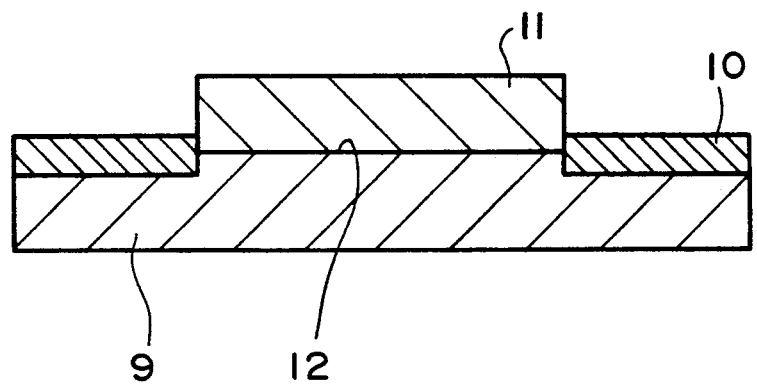
FIG. 3 is a sectional view of a mold for making the electrodes according to the present invention.

In FIG. 3 the pressure form is presented. Reference numeral 9 denotes the bases of the press form, with 10 an added measuring ring and 11 the pressure stamp. In the pressure zone 12 the pressurization takes place.

Those electrodes are now suitable to act as electrodes for an electricity-producing or electricity-storing cell.

EXAMPLE 2

Main and Auxiliary Component 3.0 g activated charcoal of the specifications according to Example 1, 1.2 g of the 7.5% polyvinylchloride solution in tetrahydrofuran, 1.0 g carbon fibers of a length 1–5 mm and a thickness of 0.001 to 0.05 mm, are turned into a sludge which is dried within 12 hours at 14° C.

The dry-material is pulverized for 1 minute in a turbo-mixer and then pressed into two electrodes of 2.7 g each in a form at 120° C. for 40 minutes at 200 bar. The pressed forms are then treated as in Example 1 and are then to be utilized as metal-free organic electrodes for chemical cells, batteries and/or storage cells.

EXAMPLE 3

Main Component and Second and Third Auxiliary Component 1.5 g activated charcoal as in Example 1, 0.5 g graphite, 0.5 g of 16% carbon black in 14% polyvinylchloride extruded, 1.6 g polyvinylchloride 7.5% in tetrahydrofuran.

EXAMPLE 4

Main Component With Polyvinyl-Alcohol Variant 3.0 g activated charcoal as in Example 1 are mixed with 16.0 g polyvinyl-chloride 7.5% in tetrahydrofuran and the sludge is dried within 12 hours at 30° C. The dry substance is ground and mixed intimately with a mixture of 1 g polyvinyl-alcohol and 1 g polyvinyl-acetate in 10 g solvent methanol and the mixture is dried at 80° C. under vacuum.

The dry material is pulverized again and two electrodes of equal weight are produced from it by pressing in a form at 160° C. 40 minutes at a pressure of 100 bar. The resulting electrode material has a surface resistance of 1.5 Ohm.cm.

Then the pressed forms are treated as described in Example 1 and are then to be used a metal-free organic electrodes in electricity producing and electricity-storing cells.

EXAMPLE 5

Example 1 is repeated with the modification that instead of 3.0 g activated charcoal 3.0 g platinum-activated charcoal with the content of 2% platinum or 3.0 g palladium-activated charcoal with the content of 2% palladium (weight-%) are utilized.

All resulting electrodes have the following sizes:

Diameter 50 mm, thickness 2–3 mm. This is the consequence of the metal form utilized.

EXAMPLE 6

9 g Activated charcoal (Norit A)
1 g synthetic graphite
1.9 g low molecular weight PVC
8.1 g high molecular weight PVC
1.6 g very high molecular weight PVC
1.6 g molybdenumtrioxide
are ground in a ball mill for 24 hours. Then for each electrode 4.050 g are added into the described form and equally distributed by shaking and are subjected in this form to a pressure of 250 bar for a time of 2 hours at 200° C.

Then a loss by thermolysis of 300 mg for each electrode is calculated by weighting.

The pressed forms then have a specific passage resistance of 3.2 Ohm.cm. They are built into the experimental cell of FIG. 1 and have after a loading time of 12 hours with the constant current of 50 mA a capacity of 48 mAh.

EXAMPLE 7

12 g activated charcoal (Norit A)
8 g high molecular weight PVC
8 g cross linked polyvinylpyridin
4 g synthetic graphite
1 g Ag$_2$O
are ground in a ball mill for 14 hours. Then 3,000 g each are added to the form of FIG. 3 and are there equally distributed by shaking and subjected then in the form to a pressure of 500 bar at a temperature of 250° C. for 30 minutes. The loss by thermolysis amounts to 400 mg for each electrode; these have a specific passage resistance of 2.6 Ohm.cm. They are inserted into the experimental cell according to FIG. 1 and after the loading of 12 hours with the constant current of 50 mA they have a capacity of 50 mAh.

EXAMPLE 8

12 g activated charcoal (Norit A)
8 g high molecular weight PVC
4 g low molecular weight PVC
4 g Polyvinylalcohol
4 g Graphite
2 g Anilin are ground in a ball mill for 14 hours. Then 2.4 g each are put into the form described in FIG. 3 and are then subjected at a temperature of 200° C. to a pressure of 1000 bar for 2 hours. Then the loss by thermolysis amounts to 600 mg. The pressed form then have a specific passage resistance of 1.8 Ohm.cm. They are inserted into the experimental cell of FIG. 1 and have after a loading time of 12 hours with the constant current of 15 mA a capacity of 48 mAh.

EXAMPLE 9

12 g activated charcoal
12 g very high molecular weight PVC
2 g Polyvinylacetate
4 g Graphite
1 g Ni-powder
2 g low molecular PVC are ground for 12 hours in a ball mill. Then 2.3 g each are added to the form described in FIG. 3 and are subjected therein to a pressure of 250 bar over a time span of 2 hours and 15 minutes. The loss by thermolysis amounts to 200 mg. The pressed forms then have a specific passage resistance of 4.6 Ohm.cm. They are then inserted into the experimental cell of FIG. 1 and have after a loading time of 12 hours with a constant current of 50 mA a capacity of 40 mAh.

In the embodiments described herein, a binder material can be optionally added in the mold prior to heating and pressurizing the material. A preferred binder material is polyvinylidenfluoride.

The reaction of activated charcoal may be accelerated by a catalyst, preferably elements and/or components of vanadium, platinum and/or copper. The ratio of activated charcoal and vinylpolymer ranges from 1-99 weight percent and from 99-1 weight percent.

The organic electrode is produced at a pressure from 2-2000 bar and at a temperature of 40°-300° C. After heating and pressurizing, the electrodes may be oxidized in an oxygen condition and/or reduced with hydrogen. Oxidation and reduction may occur simultaneously in an electrolyte with an electric current.

I claim:

1. Process for the production of carbon-containing electrodes comprising:
   mixing a non-conductive activated charcoal containing material with a non-conductive vinylpolymer-containing material,
   forming the mixture into a desired electrode shape, and
   heating and pressurizing the formed mixture to a temperature and pressure sufficient to effect a chemical change of the vinypolymer and to form a stable crystalline layered structure connected with a stable chain of alternating double bonds, with electron conductance occurring on the layered structure and ion-conductance in the chain structure so that the resultant electrode becomes conductive,
   wherein mixing comprises combining activated charcoal and a vinylpolymer of the general formula:

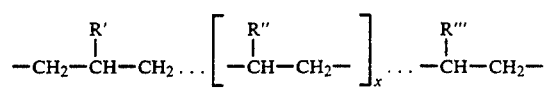

whereby
X=1 to 100000
R'=halogen or ester-group
R"=hydroxyl-group
R'''=ether-group
where the position of the substituents R', R" and R''' is exchangeable among each other,
said activated charcoal and vinylpolymer being further mixed with a 7.5% solution of polyvinylchloride in tetrahydrofuran to form a sludge which is dried, pulverized and placed in a form, and then subjected to a pressure of 2-2000 bar and a temperature of 40° to 300° C. to thereby yield an electrode.

2. Process according to claim 1, wherein the resulting electrode is formed in a mold.

3. Process according to claim 2, further comprising binding materials added to the mold.

4. Process according to claim 2, wherein the resulting electrode is disc-shaped.

5. Process according to claim 1, wherein the chemical change between activated charcoal and the vinylpolymer is accelerated by addition of a catalyst.

6. Process according to claim 5, wherein the catalyst is selected from the group consisting of of vanadium, platinum and copper.

7. Process according to claim 1, wherein the ratio of activated charcoal and vinylpolymer ranges from 1-99 weight percent and from 99-1 weight percent.

8. Process according to claim 1, further comprising oxidizing the organic electrode material in an oxygen-oxidized condition after heating and pressurizing.

9. Process according to claim 1, further comprising reducing the organic electrode material with hydrogen after heating and pressurizing.

10. Process according to claim 1, further comprising reducing and oxidizing the organic electrode material in an electrolyte, whereby reduction and oxidation are carried out at the same time after heating and pressurizing.

11. Process according to claim 1 further comprising oxidizing and reducing the organic electrode material anodically and cathodically with electrical current, whereby currents between 0.1 mA to 100 mA are applied.

12. Process according to claim 1, further comprising adding a conducting material selected from the group consisting of carbon fibers, carbon black, graphite, and combinations thereof, to the mixture prior to forming.

13. Process according to claim 5, wherein the catalyst is selected from the group consisting of compounds of vanadium, compounds of platinum and compounds of copper.

14. Process according to claim 1, wherein mixing comprises combining activated charcoal and a vinyl-polymer of the general formula:

$$-CH_2-\underset{R'}{\overset{|}{CH}}-CH_2\cdots\left[-\underset{R''}{\overset{|}{CH}}-CH_2-\right]_x\cdots-\underset{R'''}{\overset{|}{CH}}-CH_2-$$

whereby
X = 1 to 100000
R' = ester-group
R'' = hydroxyl-group
R''' = ether-group
where the position of the substituents R', R'' and R''' is exchangeable among each other.

* * * * *